No. 773,087. PATENTED OCT. 25, 1904.
M. W. MIRACLE.
CHEESE CUTTER.
APPLICATION FILED FEB. 8, 1904.
NO MODEL. 2 SHEETS—SHEET 2.
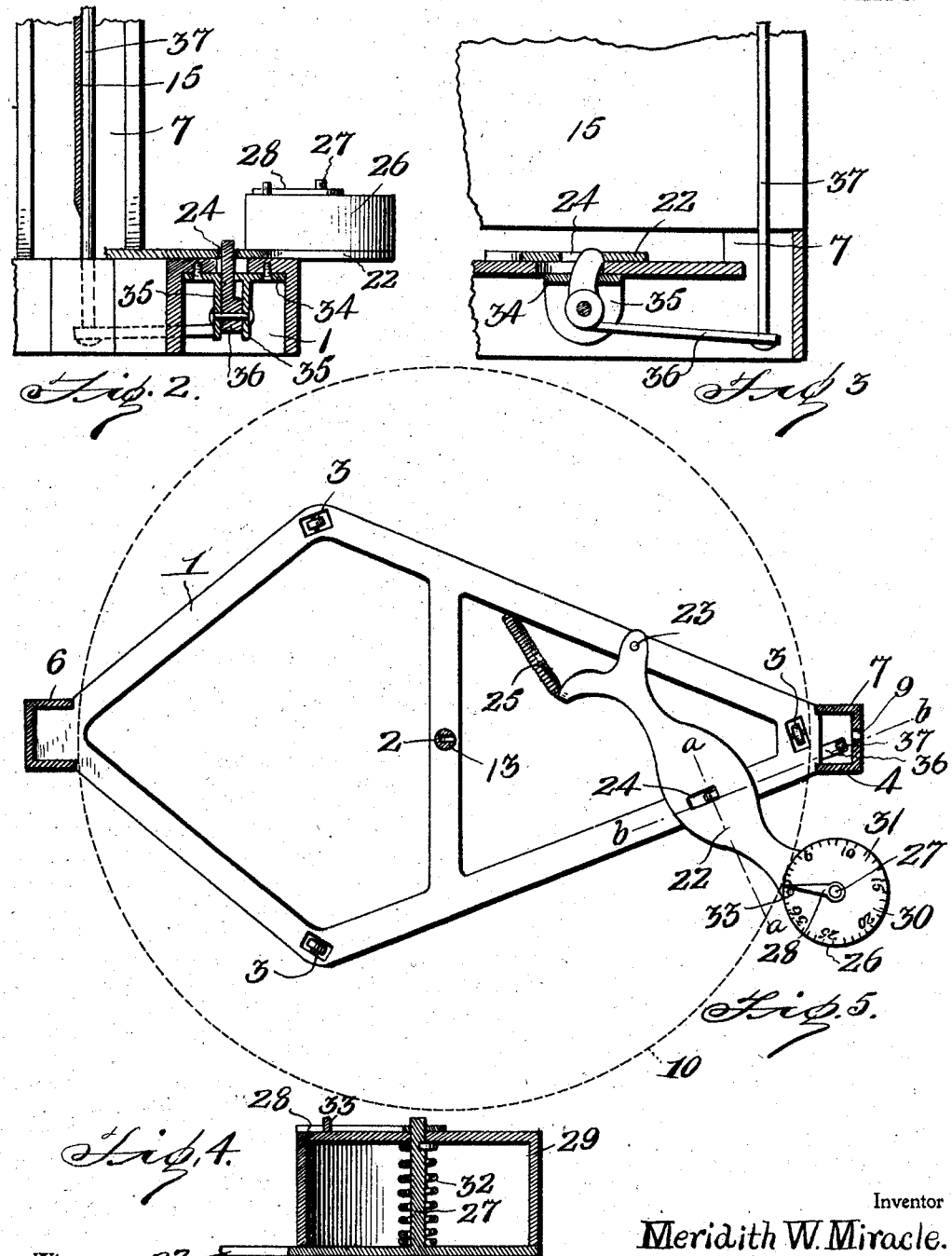
Witnesses
Jas A. Koehl.
Inventor
Meridith W. Miracle.
By H. B. Wilson
Attorney No. 773,087. Patented October 25, 1904.

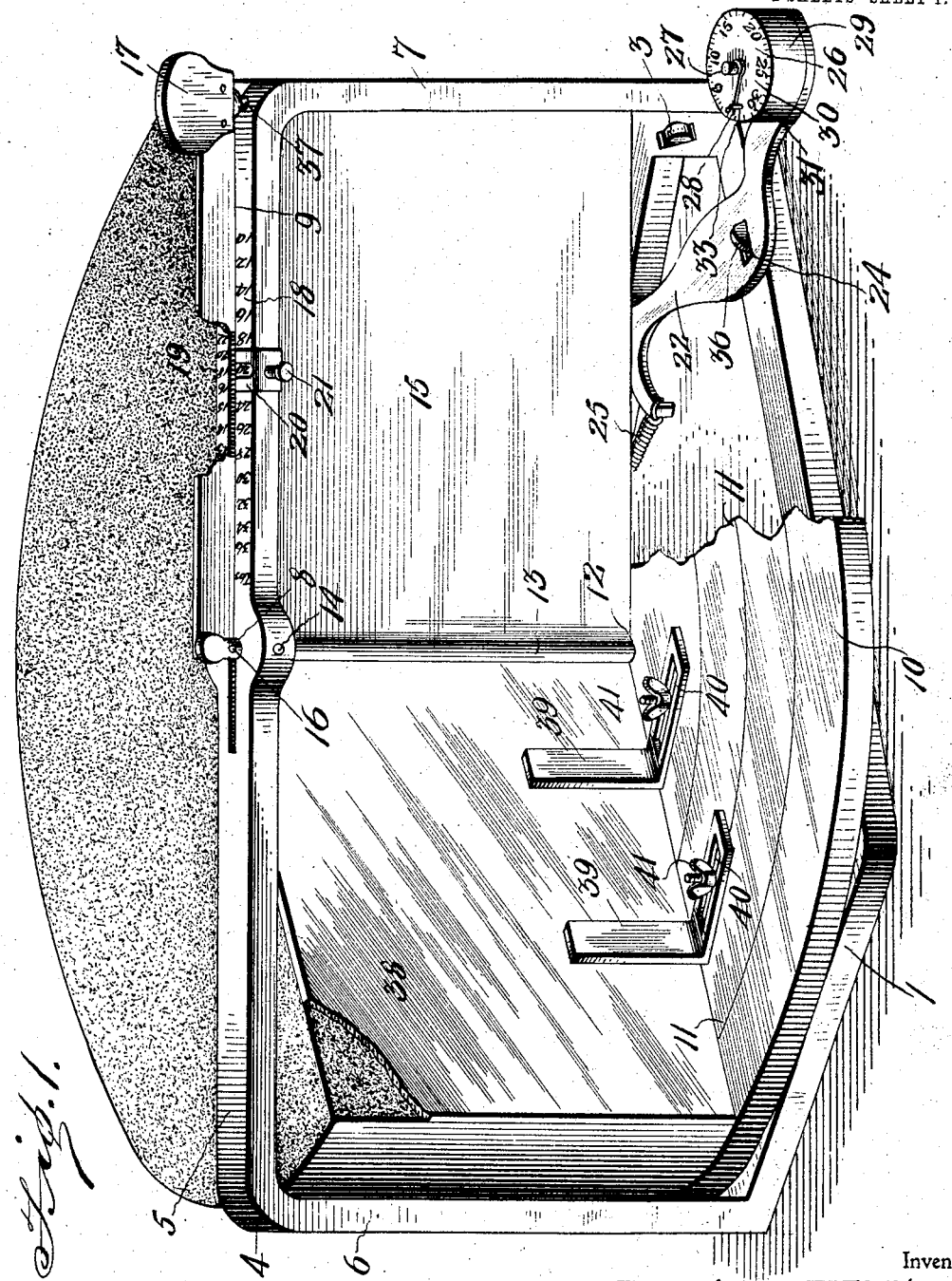

UNITED STATES PATENT OFFICE.

MERIDITH W. MIRACLE, OF SPRINGDALE, ARKANSAS, ASSIGNOR OF ONE-HALF TO WILLIAM E. BRUFFEY, OF SPRINGDALE, ARKANSAS.

CHEESE-CUTTER.

SPECIFICATION forming part of Letters Patent No. 773,087, dated October 25, 1904.

Application filed February 8, 1904. Serial No. 192,599. (No model.)

*To all whom it may concern:*

Be it known that I, MERIDITH W. MIRACLE, a citizen of the United States, residing at Springdale, in the county of Washington and State of Arkansas, have invented certain new and useful Improvements in Cheese-Cutters; and I do declare the following to be a full, clear, and exact description of the invention, such as will enable others skilled in the art to which it appertains to make and use the same.

My invention is an improved cheese-cutter adapted for use in cutting a predetermined quantity from a cheese of any weight or diameter; and it consists in the construction, combination, and arrangement of devices hereinafter described and claimed.

In the accompanying drawings, Figure 1 is a perspective view of a cheese-cutter embodying my improvements, parts of the revolving cheese-board being omitted to disclose the subjacent mechanism. Fig. 2 is a detail transverse sectional view taken on the plane indicated by line *a a* of Fig. 5. Fig. 3 is a similar view taken on the plane indicated by the line *b b* of Fig. 5. Fig. 4 is a detail sectional view showing the construction of the registering-dial which coacts with the revolving cheese-board to predetermine the size of the piece of cheese of a desired weight to be cut by the cheese-cutter. Fig. 5 is a horizontal sectional view taken on a plane intersecting the base-frame.

The base 1 of my improved cheese-cutter is here shown as triangular in form and of open construction, has a centering-opening 2, and is provided with antifriction-rollers 3, mounted therein, the upper sides of which also project above the upper side of the base. A vertically-disposed yoke-frame 4 may be either formed integrally with the base or formed separately therefrom and attached thereto. This yoke-frame comprises a horizontally-disposed cross-bar 5 and the standards 6 7 at the ends thereof, which rise from the ends of the base. The said cross-bar 5 of the yoke-frame is provided with a central vertical opening 8, which is in line with the opening 2 of the base-frame, and said frame is provided with a vertical slit 9, of suitable width, which extends slightly beyond the opening 8 to the upper end of the said frame and also extends downwardly through the standard 7.

The cheese-board 10, which serves to support the cheese and to enable the same to be readily turned, is circular in shape, of suitable diameter and thickness, and is supported on the antifriction-rollers 3 of the base. On the upper side of the said cheese-board are concentric rings 11, marked thereon, which are useful in centering the cheese of any size on the cheese-board, and the latter has a central opening 12 to register with the openings 2 and 8 of the base and yoke frame. A pin 13 forms the pivot for the cheese-board when the said pin is placed in the openings 8, 12, and 2, as shown in Fig. 1. This pin has a vertical slot and may be readily removed to permit the removal of the cheese-board and when in place is secured by means of a cross-pin 14, fitted in alined openings, with which the pin and the transverse arm of the yoke-frame are provided. The cheese-knife 15 has a blade of suitable size and shape, here shown as of oblong rectangular form and relatively thin, so that it may operate in the slit 9 of the yoke-frame. One corner of the cheese-knife is pivoted, as at 16, to the upper end of the pin 13. Hence the cheese-knife is removable with the pin. The inner edge of the knife rests in the slot in one side of the pin when the knife is in its normal lower position after having made a cut. At the outer upper corner of the cheese-knife is a handle 17, by means of which it may be readily forced downwardly through a cheese on the cheese-board to cut a piece therefrom, as will be readily understood.

On the upper side of the cross-arm 5, between the central opening 8 and the standard 7, are scales 18 19, the numerals on which are arranged in reverse order, those on the scale 18 corresponding to the weight in pounds of cheeses of various weights, and those on the scale 19 indicating the number of points that a cheese of any known weight must be turned angularly before using the knife to cut a pound therefrom—that is to say, assuming that a cheese weighs when uncut twenty pounds the corresponding number "18" on the scale 19 indicates that the cheese must be turned angularly to the extent indicated by eighteen points on a scale hereinafter described in order to cut one pound from the cheese. A pointer 20 is slidably secured on the arm 5 to move across the scale 18 and adapted to be set at any point to register with the unit-mark thereon and to also register with a unit-mark on the scale 19. A set-screw 21 is here shown for this purpose. An arm 22 is pivoted on the base 1, as at 23, lies under the cheese-board, and projects outwardly beyond the same. This arm has an opening 24 of suitable size and shape, is moved normally in one direction by a spring 25, and carries at its outer end, which projects beyond the periphery of the cheese-board, an indicating device 26, the same comprising the pin 27, which is fast to and rises from the arm 22, a pointer 28, secured to the upper end of the pin, a barrel 29 on the arm and around the pin, a dial 30, having a scale 31, which corresponds with the scale 19, and a spring 32, the function of which is to turn the barrel in one direction, so as to normally move a stop 33 against one side of the pointer 28 and cause the latter to coincide with the naught-mark on the dial. This barrel by the movements of the arm 22, caused by the action of the spring 25, normally turns against the periphery of the cheese-board, so that when the latter is partly turned to correspondingly turn the cheese-board the barrel is turned by frictional contact with the cheese-board against the tension of the spring 32, so that the dial 31 moves with reference to the pointer 28. When the figure of the dial corresponding with the required figure of the scale 19 to indicate a piece of cheese of the desired weight coincides with the pointer 28, the operator ceases to turn the cheese-board and then cuts the cheese by means of the knife.

A bracket 34 is secured to the under side of the base 1 at a suitable point and is provided with lugs 35, between which is pivoted a bell-crank 36, the short arm of the bell-crank extending upwardly through the opening 24 of the arm 22, so that the bell-crank is connected to the said arm and may be employed for moving the latter angularly, so as to cause the indicating device 29 to be moved tangentially with reference to the periphery of the circular cheese-board and out of contact therewith against the tension of the spring 25. An operating-rod 37 is vertically disposed, and its lower end engages the long arm of the bell-crank. The said operating-rod extends upwardly through an opening in the yoke-frame, is guided therein, and its upper end projects normally above the top of the yoke-frame. When the knife is operated to cut a piece of cheese, the handle 17 descends at the conclusion of the cut onto the upper end of the operating-rod 37, thereby depressing the latter and causing it to actuate the bell-crank, the latter serving to move the arm 22 angularly, so as to release the indicating device 29 from frictional contact with the periphery of the circular cheese-board, and hence permitting the spring 32 to partly turn the indicating device in the reverse direction to that of its movements by the cheese-board, so as to engage the stop 33 with the pointer 28 and set the indicating device at the naught-mark in register with the pointer.

It will be understood that the cutting-blade when it has just cut a piece of cheese lies against one side of the cut in the cheese, so as to cover the same and prevent it from becoming dried and from losing weight by evaporation. The opposite side of the cut is protected by a plate 38, which may be made of glass or of any other suitable material, which plate is maintained in place against the cut by means of standard brackets 39, having base-slots 40, in which set screws or other suitable devices 41, which secure them adjustably on the cheese-board.

It will be understood that the scales 18 19 and those of the indicating device 29 must correspond with a cheese of a given size and weight. It will also be understood that a plurality of scales may be employed for the various sizes and weights of cheese, so that the cutter may be adapted for cutting a piece of cheese of any desired weight from the cheese of any size or weight.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a cheese-cutter, the combination with a relatively fixed cutting device, of a cheese-carrying element movable with reference thereto, to position a cheese for cutting, an indicator actuated by the movement of the cheese-carrier for the purpose set forth, and means actuated by the cutting movements of the cheese-cutting device to disengage the indicator from the cheese-carrying element.

2. In a cheese-cutter, the combination with a relatively fixed cheese-cutting device, a revoluble cheese-board, a movable element and indicating devices carried thereby, means coacting with said movable element to engage the indicating device with the cheese-board for operation thereby when the cheese-board is turned, and means for disengaging the indicating device from the cheese-board, substantially as described.

3. In a cheese-cutter, the combination of a relatively fixed cutting device, a revoluble cheese-board, an angularly-movable arm having its pivot eccentric to the axis of the cheese-board, a revoluble indicating device carried by the said arm, and means to turn said arm to engage said indicating device with the cheese-board, for rotation thereby when the cheese-board is turned.

4. In a cheese-cutter, the combination of a relatively fixed cheese-cutting device, a revoluble cheese-board, a pivoted element, an indicator carried thereby, adapted for operation by the movement of the cheese-board, and means operated by the cheese-cutting device to release the indicator from the cheese-board.

5. In a cheese-cutter, the combination of a relatively fixed cutting device, a revoluble cheese-board, an angularly-movable arm having its pivot eccentric to the axis of the cheese-board, a revoluble indicating device carried by the said arm, a spring to turn said arm to engage the indicating device with the cheese-board for rotation thereby when the cheese-board is turned, and means actuated by the cutting movement of the cutting device to reversely turn said arm and disengage the indicating device from the cheese-board.

6. In a cheese-cutter, the combination of a relatively fixed cutting device, a revoluble cheese-board, an angularly-movable arm having its pivot eccentric to the axis of the cheese-board, an indicating device carried by said arm and comprising a revoluble element having an annular scale, and a stop, a fixed pointer to coact with said scale, a spring to normally turn the said element to engage the stop with the pointer, and a spring to move said arm, to engage the revoluble element of the indicating-scale with the cheese-board, for rotation thereby when the cheese-board is turned.

In testimony whereof I have hereunto set my hand in presence of two subscribing witnesses.

MERIDITH W. MIRACLE.

Witnesses:
 I. M. DAVIS,
 SAMUEL C. CRAWFORD.